US00RE39070E

(19) United States
(12) Reissued Patent
Stong et al.

(10) Patent Number: US RE39,070 E
(45) Date of Reissued Patent: Apr. 18, 2006

(54) WEAR RESISTANT COATING FOR PISTON RINGS

(75) Inventors: Thomas C. Stong, Kent City, MI (US); Thomas J. Smith, Muskegon, MI (US); Peter J. Einberger, Muskegon, MI (US)

(73) Assignee: Dana Corporation, Toledo, OH (US)

(21) Appl. No.: 10/751,347

(22) Filed: Dec. 31, 2003

Related U.S. Patent Documents

Reissue of:
(64) Patent No.: 6,562,480
Issued: May 13, 2003
Appl. No.: 09/757,891
Filed: Jan. 10, 2001

(51) Int. Cl.
*C22C 19/05* (2006.01)
*B32B 15/00* (2006.01)
*B32B 15/16* (2006.01)
*B23P 15/08* (2006.01)

(52) U.S. Cl. ..... 428/546; 428/549; 428/660; 428/663; 428/666; 29/888.074

(58) Field of Classification Search ..... 428/546, 428/569, 660, 663, 666; 29/888.074
See application file for complete search history.

(56) References Cited

U.S. PATENT DOCUMENTS 3,556,747 A * 1/1971 Hyde et al. ..... 29/198
4,039,399 A * 8/1977 Wallace et al. ..... 204/25
4,123,072 A * 10/1978 Sharpe ..... 277/216
4,208,845 A * 6/1980 Sharpe ..... 51/290
4,334,927 A * 6/1982 Hyde et al. ..... 75/240
4,592,964 A * 6/1986 Buran et al. ..... 428/610
4,612,256 A * 9/1986 Neuhauser et al. ..... 428/547
4,756,841 A * 7/1988 Buran et al. ..... 252/26
5,126,104 A * 6/1992 Anand et al. ..... 419/12
5,547,203 A * 8/1996 Binford ..... 277/224
5,592,927 A * 1/1997 Zaluzec et al. ..... 123/668
5,605,741 A * 2/1997 Hite et al. ..... 428/216
5,702,769 A * 12/1997 Peters ..... 427/451
5,713,129 A * 2/1998 Rastegar et al. ..... 29/888.04
5,713,324 A * 2/1998 Frame et al. ..... 123/193.6
5,756,150 A * 5/1998 Mori et al. ..... 427/197
5,763,106 A * 6/1998 Blanchard et al. ..... 428/570
5,773,734 A * 6/1998 Young ..... 75/243
5,863,618 A * 1/1999 Jarosinski et al. ..... 427/450
5,906,896 A * 5/1999 Jackson et al. ..... 428/621
6,887,585 B1 * 5/2005 Herbst-Dederichs ..... 428/546

OTHER PUBLICATIONS

Dana Perfect Circle Division Material Specification, No. PCF–284, Issued Jul. 8, 1999.*
Dana Perfect Circle Divison Material Specification, No. PCHP–2, Issued Jan. 10, 2000*

* cited by examiner

*Primary Examiner*—Deborah Jones
*Assistant Examiner*—Jason L. Savage
(74) *Attorney, Agent, or Firm*—Rader, Fishman & Grauer PLLC

(57) ABSTRACT

A wear resistant coating for protecting surfaces undergoing sliding contact is disclosed. The wear resistant coating is applied by high velocity oxygen-fuel (HVOF) deposition of a powdered blend of the coating constituents. The powdered blend includes a nickel-chromium alloy, chromium carbide, and molybdenum. The disclosed coating should find use as a bearing surface on piston rings, cylinder liners, and other components of a power cylinder assembly of an internal combustion engine.

13 Claims, 3 Drawing Sheets

WEAR RESISTANT COATING FOR PISTON RINGS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to materials and methods for protecting surfaces subject to frictional forces, heat, and corrosion, and more particularly, to wear-resistant coatings that can be applied to piston rings and cylinder liners of internal combustion engines.

2. Discussion

A power cylinder assembly of an internal combustion engine generally comprises a reciprocating piston disposed within a cylindrical cavity of an engine block. One end of the cylindrical cavity is closed while another end of the cylindrical cavity is open. The closed end of the cylindrical cavity and an upper portion or crown of the piston, define a combustion chamber. The open end of the cylindrical cavity permits oscillatory movement of a connecting rod, which joins a lower portion of the piston to a crankshaft, which is partially submerged in an oil sump. The crankshaft converts linear motion of the piston—resulting from combustion of fuel in the combustion chamber—into rotational motion.

The power cylinder assembly typically includes one or more piston rings and a cylindrical sleeve or cylinder liner, which is disposed within the engine block and forms the side walls of the cylindrical cavity. The piston rings are disposed in grooves formed in the lateral walls of the piston, and extend outward from the piston into an annular space delineated by the piston wall and the cylinder liner. During movement of the piston within the cylindrical cavity, the piston rings bear against the cylinder liner. The piston rings have two main functions. First, they inhibit gas flow from the combustion chamber into the oil sump through the annular space between the piston and the cylinder liner. Second, they minimize oil flow from the oil sump into the combustion chamber.

To improve their durability, wear and scuff resistance, the piston rings, and in some cases the cylinder liner, are coated with relatively hard materials such as chromium hard plate and alloys containing chromium carbide. Although such coatings have met with considerable success, they have been found inadequate for newer engine technologies, including diesel engines employing exhaust gas recirculation (EGR).

SUMMARY OF THE INVENTION

The present invention provides coatings that offer improved wear and scuff resistance for demanding applications such as piston rings and cylinder liners of internal combustion engines.

One aspect of the present invention provides a wear resistant coating for protecting a surface undergoing sliding contact with another surface, as found, for example, in a power cylinder assembly of an internal combustion engine. The wear resistant coating is applied by high velocity oxygen-fuel deposition of a powder, which comprises a blend of about 13 wt. % to about 43 wt. % of a nickel-chromium alloy, about 25 wt. % to about 64 wt. % chromium carbide, and about 15 wt. % to about 50 wt. % molybdenum.

Another aspect of the present invention provides a piston ring comprising an annular body having an outer radial periphery protected by a wear resistant coating. The wear resistant coating is applied by high velocity oxygen-fuel spraying of a powder comprising a blend of about 13 wt. % to about 43 wt. % of a nickel-chromium alloy, about 25 wt. % to about 64 wt. % chromium carbide, and about 15 wt. % to about 50 wt. % molybdenum.

A third aspect of the present invention provides a method of protecting surfaces in sliding contact. The method includes applying a wear resistant coating to one or both surfaces by high velocity oxygen-fuel deposition of a powder. The powder comprises a blend of about 13 wt. % to about 43 wt. % of a nickel-chromium alloy, about 25 wt. % to about 64 wt. % chromium carbide, and about 15 wt. % to about 50 wt. % molybdenum.

DETAILED DESCRIPTION OF THE PREFERRED EMBODIMENTS

Figure 1:
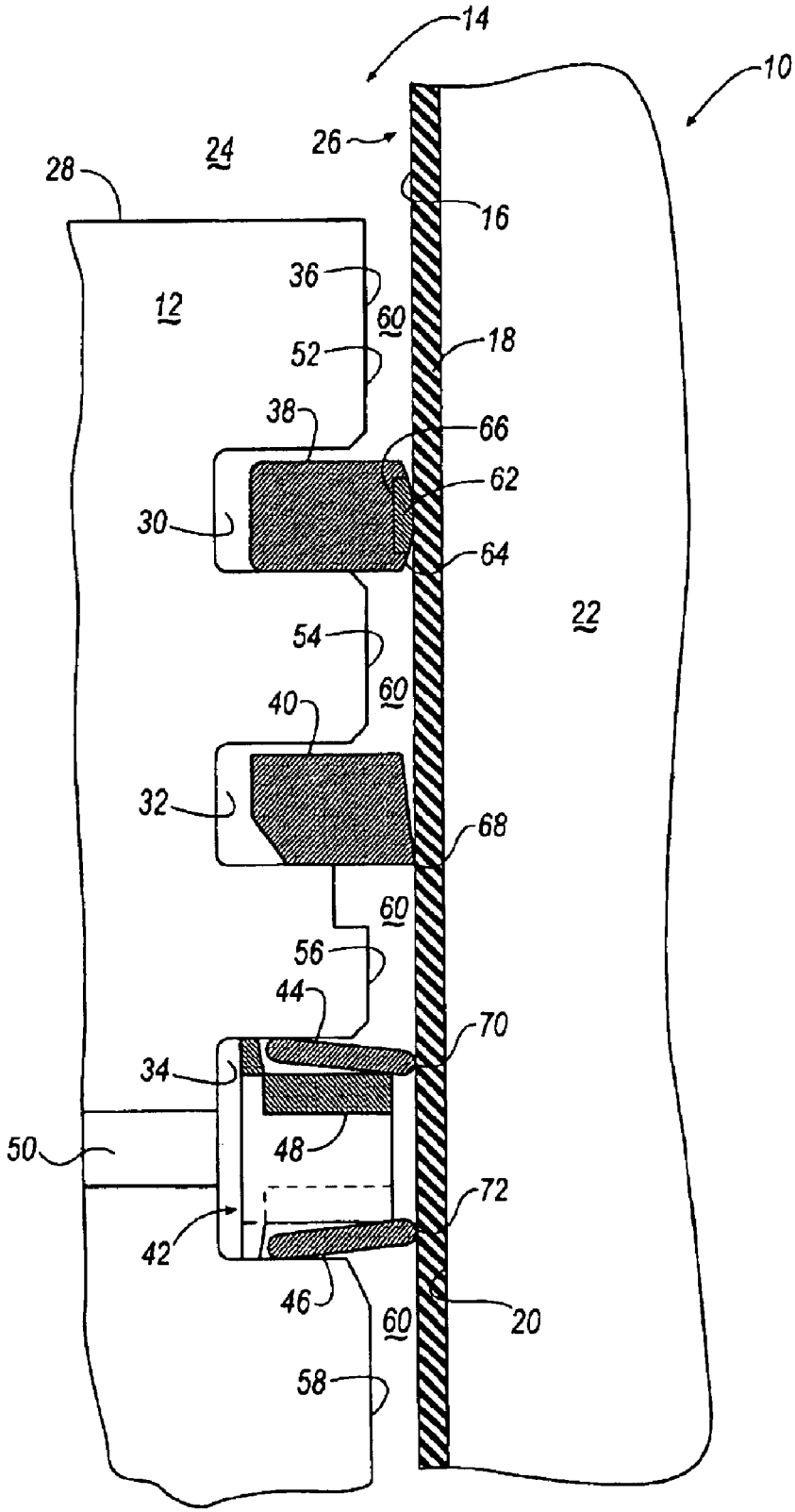
FIG. 1 shows a partial cross-sectional view of a piston ring having a wear resistant coating.

FIG. 1 shows a cross-sectional side view of a portion of a power cylinder assembly 10 of an internal combustion engine. The power cylinder assembly 10 includes a piston 12, which can move linearly within a cylindrical cavity 14 that is defined by an inner wall 16 of a cylinder liner 18 or cylindrical sleeve. The cylinder liner 18 is disposed within a cylindrical bore 20 formed in an engine block 22. The power cylinder assembly 10 includes a combustion chamber 24, which is defined by an upper portion 26 of the cylinder liner 18 and a top portion or crown 28 of the piston 12. During engine operation, fuel combustion in the combustion chamber 28 generates gas pressure that pushes against the crown 28 of the piston 12, driving the piston 12 downward.

In addition to the crown 28, the piston 12 includes first 30, second 32, and third 34 grooves formed in a lateral wall 36 of the piston 12. Each of the grooves 30, 32, 34 are sized to accept, respectively, first 38 and second 40 piston (compression) rings, and an oil ring assembly 42. The oil ring assembly 42 includes a pair of rails 44, 46, and a sinusoidal expander 48, which pushes the rails 44, 46 outward from the lateral wall 36 of the piston 12. The expander 48 also includes a drain slot 50 (shown by hidden lines) that channels oil away from the inner wall 16 of the cylinder liner 18 to an oil sump via a conduit (not shown) within the piston 12. As can be seen in FIG. 1, first 52, second 54, and third 56 lands separate each of the grooves 30, 32, 34 and help retain the piston rings 38, 40 and the oil ring assembly 42 in their respective grooves 30, 32, 34. The piston 12 also includes a lower skirt 58, which reduces lateral movement of the piston 12 during the combustion cycle.

As shown in FIG. 1, the first 38 and second 40 piston rings, and the rails 44, 46 of the oil ring assembly 42, contact the inner wall 16 of the cylinder liner 18. The rings 38, 40 and rails 44, 46 act as sliding seals that prevent fluid flow through an annular region 60 formed by the lateral wall 36 of the piston 12 and the inner wall 16 of the cylinder liner 18. Thus, the first piston ring 38, and to some extent the second piston ring 40 and the oil ring assembly 42 rails 44, 46, reduce gas flow from the combustion chamber 24 to the oil sump region of the engine. Similarly, the rails 44, 46 of the oil ring assembly 42 and the second 40 piston ring (and to less extent the first 38 piston ring), help prevent oil in the sump from leaking into the combustion chamber 24.

In the embodiment shown in FIG. 1, a coating 62 is disposed on a radial periphery 64 of the first piston ring 38 to improve durability, wear resistance and scuff resistance of the first piston ring 38 and the cylinder liner 18. As can be seen in FIG. 1, the radial periphery 64 of the first piston ring 38 includes a radial groove 66, which improves the adhesion of the coating to the first piston ring 38. The coating 62 can also be applied to other surfaces of the power cylinder assembly 10 that are subject to frictional forces (bearing surfaces), heat, or corrosion. Such surfaces include, but are not limited to, the inner wall 16 of the cylinder liner 18, and radial peripheries 68, 70, 72 of the second piston ring 40 and the rails 44, 46 of the oil ring assembly 42.

The coating 62 comprises an alloy of one or more base metals, a hard ceramic material, and molybdenum. The base metal serves as a binder for the hard ceramic material. Suitable base metals include nickel, chromium, and, preferably, mixtures of nickel and chromium. A useful base metal is a nickel-chromium alloy containing from about 40 wt. % to about 60 wt. % nickel. The base metal generally comprises about 13 wt. % to about 43 wt. % of the coating 62, and more particularly, about 18 wt. % to about 35 wt. % of the coating 62. A preferred coating 62 includes at least 7.2 wt. % of chromium from the nickel-chromium alloy. An especially useful coating 62 includes about 28 wt. % of a nickel-chromium alloy containing about 50 wt. % nickel.

The hard ceramic material, which imparts wear resistance, ordinarily should remain substantially solid throughout application of the coating 62. Examples of hard ceramic materials include chromium carbide, vanadium carbide, and tungsten carbide. Of these, chromium carbide is especially useful. The hard ceramic materials are available as finely divided powders ranging in size from about 200 microns to less than about 45 microns. Useful forms of chromium carbide include $Cr_3C_2$, $Cr_7C_3$, and $Cr_{23}C_6$, among others, and a mixture of $Cr_7C_3$, and $Cr_{23}C_6$ is particularly advantageous. The hard ceramic material generally comprises about 25 wt. % to about 64 wt. % of the coating 62, and more particularly, about 35 wt. % to about 53 wt. % of the coating 62. When the chromium carbide level is less than about 25 wt. %, the abrasion or wear resistance of the coating 62 is inadequate for power cylinder applications, and when the chromium carbide level is greater than about 64 wt., the coating 62 is too brittle. A particularly useful coating 62 comprises about 42 wt. % chromium carbide, which includes about 50 wt. % $Cr_7C_3$ and about 50 wt. % $Cr_{23}C_6$.

Although the base metal and the hard ceramic component of the coating 62 can be dry-blended, it is advantageous to pre-alloy the components prior to application. Suitable alloying techniques include liquid and gas atomization, which generate particles having substantially uniform concentrations of the base metal and the hard ceramic component. For example, a pre-alloyed mixture of chromium carbide and nickel-chrome, which is produced by atomization, is available under the trade designation CRC-291 form Praxair Inc. The pre-alloyed mixture comprises about 60 wt. % chromium carbide, primarily as $Cr_7C_3$ and $Cr_{23}C_6$, and about 40 wt. % of a nickel-chrome alloy. The chromium carbide portion of the mixture contains about equal amounts (by weight) of $Cr_7C_3$ and $Cr_{23}C_6$, and the nickel-chrome alloy contains about equal amounts (by weight) of nickel and chromium. The pre-alloyed mixture has a maximum particle size less than about 53 microns. For a description of liquid atomization, see U.S. Pat. No. 5,863,618, "Method for Producing a Chromium Carbide-Nickel Chromium Atomized Powder," which is herein incorporated by reference.

In addition to the base metal and the hard ceramic component, the coating 62 also includes molybdenum, which imparts scuff resistance. Here, scuffing refers to binding or grabbing that may occur when two surfaces, such as the piston rings 38, 40 and the cylinder liner 18, are in sliding contact. In extreme cases of scuffing, the intense heat generated by friction may cause the two surfaces to weld together. The molybdenum component of the coating 62 may include a few weight percent impurities, such as metal oxides, and generally ranges in particle size from about 105 microns to less than about 45 microns. For power cylinder applications, molybdenum should comprise between about 15 wt. % and 50 wt. % of the coating 62—molybdenum levels less than about 15 wt. % result in coatings 62 having inadequate scuff resistance, and molybdenum levels greater than about 50 wt. % result in coatings 62 having inadequate wear resistance. A particularly useful coating 62 comprises about 30 wt. % molybdenum.

Prior to application, the powders that comprise the coating 62—base metal, hard ceramic component, molybdenum—are mixed in a dry state using a v-cone blender, a ball mill, and the like. Once blended, the coating 62 constituents are applied to the first piston ring 38, cylinder liner 18, or other bearing surfaces of the power cylinder 10 using a thermal spraying method. Suitable thermal spraying methods include plasma torch spraying, detonation gun deposition, and preferably, high velocity oxygen-fuel (HVOF) deposition. HVOF deposition generally comprises combusting an oxygen/fuel gas mixture, accelerating the resulting gas stream through a nozzle, and injecting the coating 62 constituents into the high velocity (supersonic) gas stream. The gas stream heats the coating 62 constituents to near their melting point, and propels the coating 62 constituents against the coating surface. Plasma torch spraying is a similar method, but uses electrical energy to generate a high temperature plasma that entrains the coating 62 constituents. For a discussion of various thermal spraying techniques, including detonation gun deposition, see U.S. Pat. No. 5,906,896, "Rotary Seal Member Coated with a Chromium Carbide-Age Hardenable Nickel Base Alloy," which is herein incorporated by reference.

To efficiently coat a piston ring's radial periphery, a group of piston rings are stacked on an arbor having a controllable rotation rate. A thermal spray nozzle, which propels the coating 62 constituents against the outer periphery of each of the rings, is mounted on a translation stage, which can control the position of the nozzle relative to the stack of piston rings. Prior to coating, the translation stage adjusts the standoff distance from the thermal spray nozzle tip to the stack of piston rings. To coat the rings, the arbor rotates the piston rings at a desired angular velocity while the translation stage moves the nozzle between the ends of the stack along the arbor's axis at a desired speed. For a given powder feed rate, one can adjust the coating thickness by adjusting the angular velocity of the arbor and the translation speed of the nozzle. Preferably, one can adjust the coating thickness by changing the number of nozzle translations over the arbor. Following application of the coating 62, the stack of piston rings are separated and finished by grinding.

EXAMPLES

The following examples are intended as illustrative and non-limiting, and represent specific embodiments of the present invention. The examples show that the disclosed coatings have consistently better wear resistance in engine testing than competing coating formulations. In addition, the examples demonstrate that using HVOF deposition to apply the disclosed coatings results in significant and unexpected improvement in wear resistance based on engine testing.

Example 1

A pre-alloyed powder containing 60 wt. % chromium carbide, primarily as $Cr_7C_3$ and $Cr_{23}C_6$, and 40 wt. % nickel-chrome alloy was dry-blended with molybdenum powder to produce a powder mixture comprised of 30 wt. % molybdenum. The pre-alloyed powder was obtained from Praxair Inc. The chromium carbide portion of the blend contained about equal amounts (by weight) of $Cr_7C_3$ and $Cr_{23}C_6$, and the nickel-chrome alloy contained about equal amounts (by weight) of nickel and chromium. The pre-alloyed mixture had a maximum particle size less than about 53 microns. The molybdenum powder, which was obtained from CSM Inc., contained less than 1.5 wt. % impurities and had a maximum particle size less than 105 microns.

The blended powder, which contained 42 wt. % chromium carbide, 28 wt. % nickel-chrome, and 30 wt. % molybdenum, was applied to the radial periphery of a stack of piston rings using a Praxair/Tafa JP5000 HP/HVOF (high pressure/high velocity oxygen fuel) thermal sprayer. Operating parameters for the HVOF system are listed in Table 1.

TABLE 1

HVOF Operating Parameters

| Parameter | Setting or Measured Value |
|---|---|
| Oxygen Flow Rate | 1750–1850 scfh |
| Fuel Flow Rate | 5.5–6.5 gallons/hour |
| Carrier Gas Pressure | 48–52 psi |
| Carrier Gas Flow | 23–27 scfh |
| Powder Feed Rate | 78–82 grams/minute |
| Surface Speed[1] | 1200 inches/minute minimum |
| Barrel Length | 8 inches |
| Standoff Distance | 14–16 inches |

Notes:
[1]Piston ring circumference times arbor rotation rate

Figure 2:
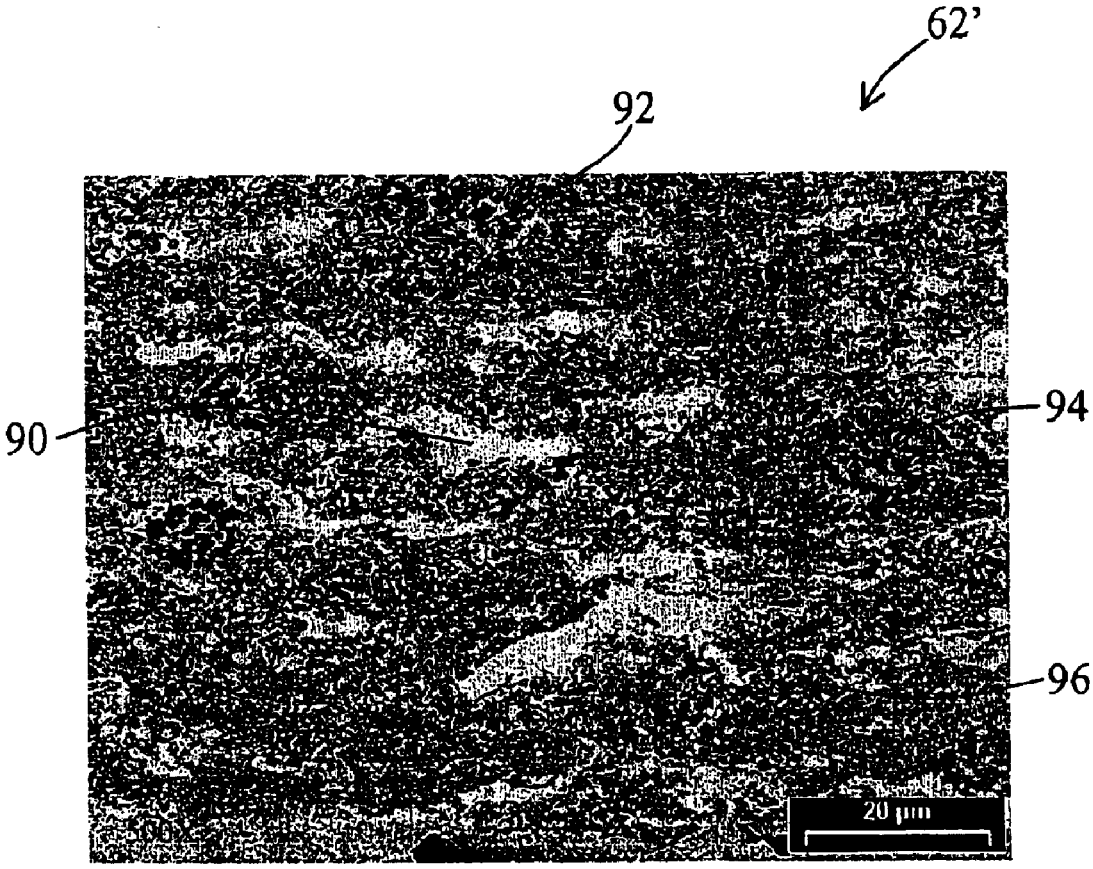
FIG. 2 is a photomicrograph of a cross section of an HVOF spray coating described in Example 1, which is viewed with backscattered electrons at 500 times magnification.

FIG. 2 is a photomicrograph of a cross section of an HVOF spray coating 62' viewed with backscattered electrons at 500 times magnification. In FIG. 2, the largest light gray areas 90 correspond to the molybdenum component, the smaller light gray areas 92 correspond to the nickel-chrome component, and the dark gray areas 94 correspond to chrome carbide. Black areas 96 represent porosity.

Example 2

Figure 3:
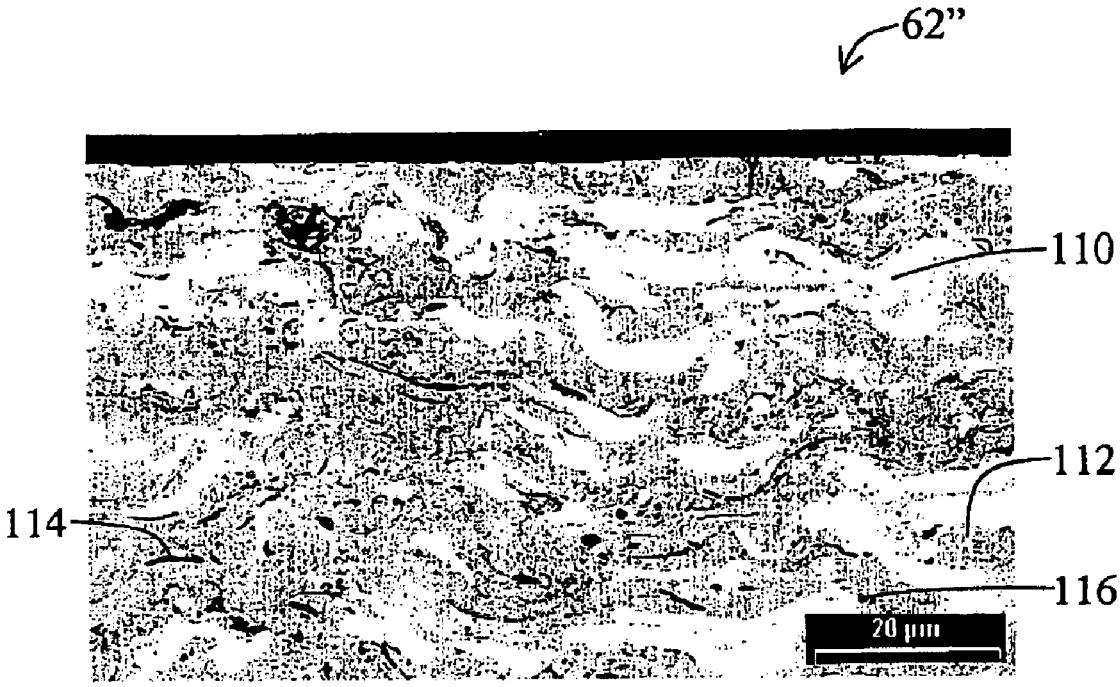
FIG. 3 is a photomicrograph of a cross section of a plasma torch spray coating described in Example 2, which is viewed with backscattered electrons at 500 times magnification.

For comparison purposes, a coating powder was prepared as described in Example 1, but was applied to the radial periphery of piston rings using plasma torch spraying instead of HVOF deposition. FIG. 3 is a photomicrograph of a cross section of the plasma torch spray coating 62" viewed with backscattered electrons at 500 times magnification. In FIG. 3, light areas 110 correspond to the molybdenum component, gray areas 112 correspond to the chromium carbide/nickel-chrome components, elongated black areas 114 corresponds to oxides, and oval-shaped black areas 116 represent porosity.

Example 3

Figure 4:
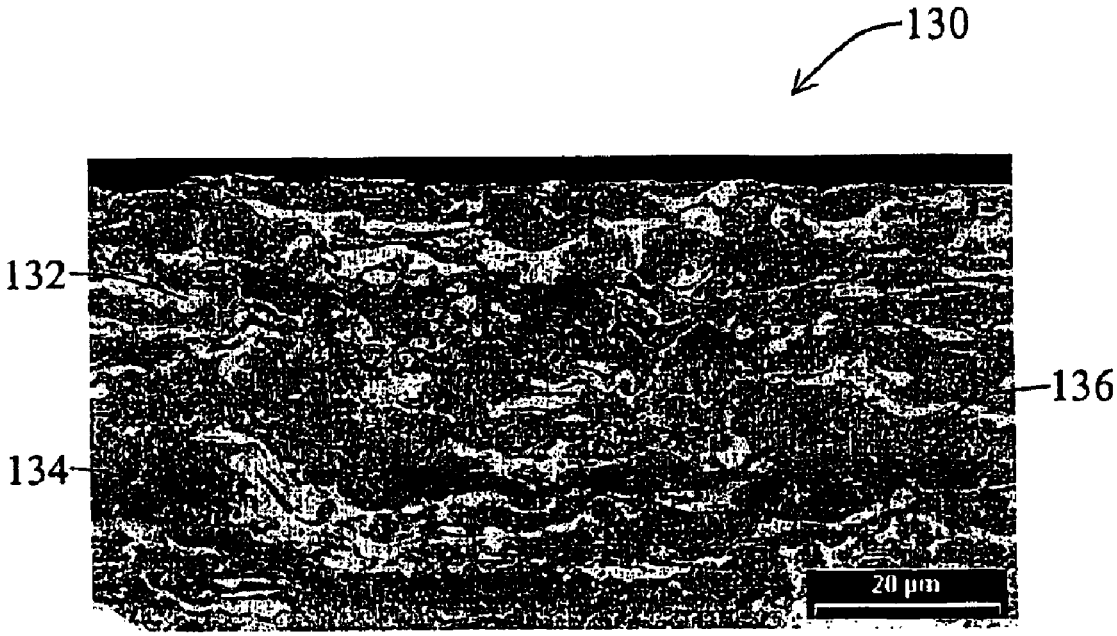
FIG. 4 is a photomicrograph of a cross section of a plasma torch spray coating described in Example 3, which is viewed with backscattered electrons at 500 times magnification.

For comparison purposes, a coating powder containing 72 wt. % chromium, 10 wt. % carbon, 10 wt. % nickel, 6 wt. % molybdenum, and 0.6 wt. % boron was dry-blended and applied to the radial periphery of piston rings using plasma torch spraying. FIG. 4 is a photomicrograph of a cross section of the plasma torch spray coating 130 viewed with backscattered electrons at 500 times magnification. In FIG. 4, light areas 132 correspond to nickel alloy, darker areas 134 correspond to chromium carbide, and black areas 136 represent porosity.

Example 4

For comparison purposes, a coating powder containing 65 wt. % molybdenum, 27 wt. % nickel-chromium alloy, and 8 wt. % chromium carbide was dry-blended and applied to the radial periphery of piston rings using plasma torch spraying. The wear resistance of the piston rings was evaluated in engine tests described below.

Example 5

For comparison purposes, the radial periphery of piston rings were coated with a sulfate hard chrome plate using a method an electrodeposition technique, which is described in U.S. Pat. No. 4,039,399, "Method of Making a Bearing Surface," which is herein incorporated by reference. The wear resistance of the piston rings was evaluated in engine tests described below.

Example 6

The piston ring coatings prepared in Example 1 and Example 3 were evaluated in a 12.0 liter displacement Mack E7 diesel truck engine using an accelerated wear test method, ASTM D6483-99. The pistons were installed in the engine, which was operated in accordance with the test method for 500 hours. Table 2 lists changes in the piston ring diameter and cylinder liner following the test. Smaller values in Table 2 represent better wear resistance.

Example 7

The piston ring coatings prepared in Example 1 and Example 3 were evaluated in a 12.0 liter displacement Mack E7 diesel truck engine using an accelerated wear test method similar to the method of Example 5, but modified for exhaust gas recirculation. The pistons were installed in the engine, which was operated for 300 hours. Table 2 lists changes in the piston ring diameter and cylinder liner following the test.

Example 8

The piston ring coatings prepared in Example 1, Example 3, and Example 5 were evaluated in a 12.7 liter displacement Detroit Diesel Series 60 diesel truck engine using a truck simulation cycle. The pistons were installed in the engine, which was operated for 400 hours. Table 2 lists changes in the piston ring diameter and cylinder liner following the test.

Example 9

The piston ring coatings prepared in Example 1–Example 4 were evaluated in a 7.3 liter International diesel truck engine using an accelerated wear test method similar to the method of Example 5, but modified for exhaust gas recirculation. The pistons were installed in the engine, which was operated for 240 hours. Table 2 lists changes in the piston ring diameter and cylinder liner following the test.

TABLE 2

Diesel Engine Wear Test Results

| Engine Test | Coating | Ring[1] (microns) | Cylinder Liner[1] (microns) |
|---|---|---|---|
| Example 6 | Example 1 | 3.0 | 5.0 |
| Example 6 | Example 3 | 6.0 | 32.0 |
| Example 7 | Example 1 | 7.6 | 1.7 |
| Example 7 | Example 3 | 11.4 | 31.2 |
| Example 8 | Example 1 | 6.3 | 11.6 |
| Example 8 | Example 3 | 9.1 | 40.6 |
| Example 8 | Example 5 | 10.9 | 11.7 |
| Example 9 | Example 1 | 9.4 | 11.2 |
| Example 9 | Example 2 | 12.2 | 31.3 |
| Example 9 | Example 3 | 11.1 | 20.8 |
| Example 9 | Example 4 | 24.0 | 21.9 |

Notes:
[1]Average of four or eight measurements around ring or liner periphery

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled. The disclosures of all patents, articles and references, including patent applications and publications, are incorporated herein by reference in their entirety and for all purposes.

What is claimed is:

1. A wear resistant coating for protecting a surface, the wear resistant coating applied by high velocity oxygen-fuel deposition of a powder, the powder comprising a blend of:

about [18] *13* wt. % to about [35] *43* wt. % of a nickel-chromium alloy;

about [35] *25* wt. % to about [53] *64* wt. % chromium carbide; and about 15 wt. % to about 50 wt. % molybdenum, wherein chromium from the nickel-chromium alloy is at least 7.2 wt. % of the blend.

2. The wear resistant coating of claim 1, wherein the powder comprises a blend of:

about 28 wt. % of the nickel-chromium alloy;

about 42 wt. % chromium carbide; and about 30 wt. % molybdenum.

3. The wear resistant coating of claim 1, wherein the powder comprises a pre-alloyed blend of nickel-chromium alloy and chromium carbide.

4. The wear resistant coating of claim 1, wherein the chromium carbide component of the powder comprises $Cr_7C_3$ and $Cr_{23}C_6$.

5. A piston ring comprising an annular body having an outer radial periphery, the outer radial periphery having a wear resistant coating applied by high velocity oxygen-fuel deposition of a powder, the powder comprising a blend of:

about 18 wt. % to about 35 wt. % of a nickel-chromium alloy;

about 35 wt. % to about 53 wt. % chromium carbide; and about 15 wt. % to about 50 wt. % molybdenum, wherein chromium from the nickel-chromium alloy is at least 7.2 wt. % of the blend.

6. The piston ring of claim 5, wherein the powder comprises a blend of:

about 28 wt. % of the nickel-chromium alloy;

about 42 wt. % chromium carbide; and about 30 wt. % molybdenum.

7. The piston ring of claim 5, wherein the powder comprises a pre-alloyed blend of nickel-chromium alloy and chromium carbide.

8. The piston ring of claim 5, wherein the chromium carbide component of the powder comprises $Cr_7C_3$ and $Cr_{23}C_6$.

9. A wear resistant coating for protecting a surface, the wear resistant coating applied by high velocity oxygen-fuel deposition of a powder, the powder comprising a blend of:

about 28 wt. % of a nickel-chromium alloy;

about 42 wt. % chromium carbide; and about 30 wt. % molybdenum.

10. A piston ring comprising an annular body having an outer radial periphery, the outer radial periphery having a wear resistant coating applied by high velocity oxygen-fuel deposition of a powder, the powder comprising a blend of:

about 28 wt. % of a nickel-chromium alloy;

about 42 wt. % chromium carbide; and about 30 wt. % molybdenum.

*11. The piston ring of claim 1, wherein there is about 18 wt % to about 35 wt. % of a nickel-chromium alloy.*

*12. The piston ring of claim 1, wherein there is about 35 wt % to about 53 wt. % of a chromium carbide.*

*13. The piston ring of claim 1, wherein there is about 18 wt % to about 35 wt. % of a nickel-chromium alloy and about 35 wt % to about 53 wt. % of a chromium carbide.*

* * * * *